United States Patent [19]
Appleberry

[11] 3,778,957
[45] Dec. 18, 1973

[54] ADJUSTMENT FASTENER
[76] Inventor: Walter T. Appleberry, Long Beach, Calif.
[22] Filed: Oct. 2, 1972
[21] Appl. No.: 293,764

[52] U.S. Cl.............................. 52/758 D, 52/617
[51] Int. Cl............................................... F16b 7/18
[58] Field of Search.......... 287/189.36 F, 189.36 D, 287/189.36 C, 56, 59, 125; 52/617; 248/188, 188.4, 354 S, 405

[56] References Cited
UNITED STATES PATENTS
| | | | |
|---|---|---|---|
| 2,856,218 | 10/1958 | Helsel | 287/125 |
| 3,291,079 | 12/1966 | Ruda | 248/188 X |
| 3,300,192 | 1/1967 | Blum et al. | 287/56 X |

FOREIGN PATENTS OR APPLICATIONS
| | | | |
|---|---|---|---|
| 207,516 | 4/1957 | Australia | 287/125 |

Primary Examiner—Jordan Franklin
Assistant Examiner—Wayne L. Shedd
Attorney—Walter J. Jason et al.

[57] ABSTRACT

A fastener for adjusting the spacing between a panel and a support or object wherein mating sets of male and female inserts between them have reverse threads or threads of different pitch. Rotation of the male portions cause longitudinal expansion and contraction to vary the spacing between the panel and object. A single tool, an Allen wrench T-handle, may be used for panel handling, insertion and attachment of parts and their adjustment.

7 Claims, 4 Drawing Figures

PATENTED DEC 18 1973

3,778,957

ADJUSTMENT FASTENER

BACKGROUND OF THE INVENTION

It is desired to install, remove, and level equipment through a single access hole in a housing and with a single access tool. Potential applications of adjustment fasteners for this purpose are housing panels, access doors, covers, and various equipment attached to panels and leveled or adjusted relative to the panels.

Leveling screws or bolts have been used with brackets which serve as feet on a piece of equipment and by rotating them the equipment may be made level. However, this works for machinery on the floor but the bolts do not serve as an attachment in holding objects or panels together.

SUMMARY OF THE PRESENT INVENTION

In joining a support and a panel, an adjustment fastener is used which consists of two male-female threaded units, one on the panel and one on the support. The two male threaded parts mate at a sloping non-conical interface whereby rotation of one causes rotation of the other. Threaded connections between the male and female parts of one unit is the reverse of the threaded connections between the male and female parts of the other unit, or if the same the threads are of a different pitch, so that rotation of the mated male parts will change the spacing between the panel and the support. A single tool may be used for installing, removing and adjusting of parts.

DETAILED DESCRIPTION OF THE INVENTION

Figure 1:
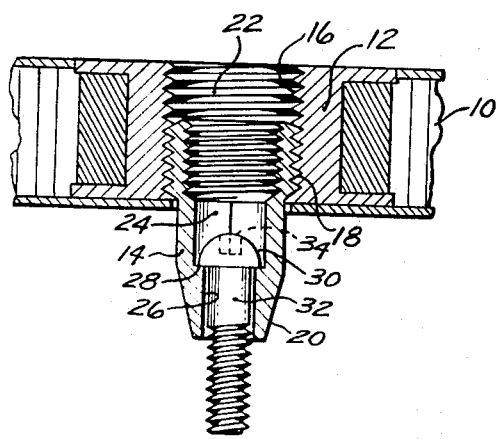
FIG. 1 is a vertical sectional view of the panel units.

Referring now to FIG. 1 there is shown a panel 10 which may be a housing or wall either to support an object or to provide access to the object. Through this panel is a threaded fitting 12 into which a threaded male insert 14 is placed. The inner threads 16 of fitting 12 engage the outer threads 18 of insert 14 and may be right-hand threads so that clockwise rotation of insert 14 will deepen its penetration into fitting 12. The inner end 20 of insert 14 is tapered for self-centering purposes and is non-conical so that when rotated it will cause rotation of the member into which it engages. Insert 14 has an enlarged threaded upper bore 22 to receive a handle for lifting and placing of the panel 10 or to lift and move an object fastened to the panel 10. A central bore 24 has a non-circular cross section to receive a tool to cause rotation of the insert 14. A reduced lower bore 26 connects with bore 24 and has a shoulder 28 to receive the head 30 of a fastener 32 which extends downwardly through bore 26. Head 30 also has a non-circular recess 34 for receiving a tool for rotation. Bore 24 and recess 34 preferably are hexagonal to receive an end of an Allen hex wrench. Fastener 32 may be a threaded bolt as shown or it may have other means of attachment to the support unit fastener receptacle 34 in FIG. 2.

Figure 2:
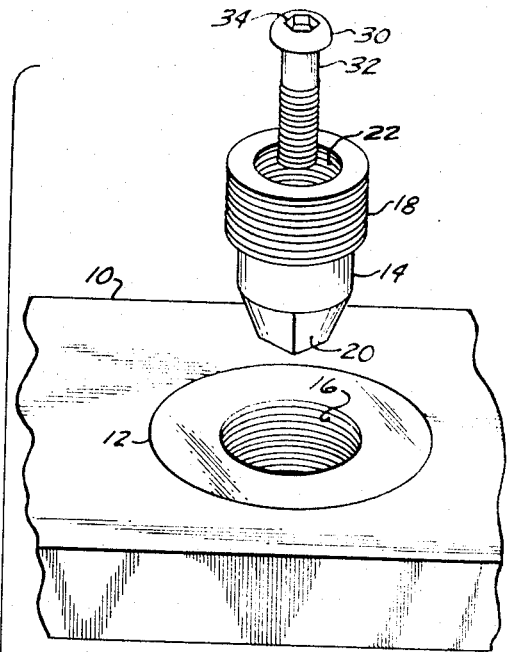
FIG. 2 is a vertical sectional view of the support units.
Figure 2:
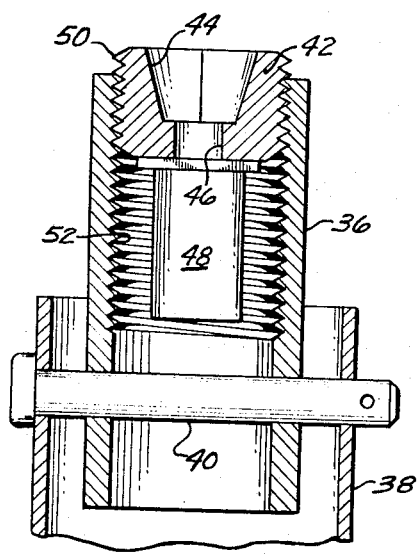

In FIG. 2 there is shown a female threaded receptacle 36 releasably connected to an object or support 38 by means of a pin 40. However, the receptacle 36 may be welded or bonded to the support or may be a threaded bore tapped into the support as desired.

A male threaded insert 42 is threadedly inserted into the top of receptacle 36. This insert has a bore 44 with tapered non-conical walls adapted to receive the inner end 20 of insert 14 in FIG. 1. This bore terminates in a smaller cylindrical bore 46 adapted to pass the lower end of fastener 32 in FIG. 1 into the fastener receptacle 48 attached to the end of insert 42. This fastener receptacle releasably retains fastener 32 to hold the panel unit to the support unit, even when the mated male inserts are rotated for adjustment. After adjustment the fastener 32 may be removed if desired and the panel 10 and support 30 may be separated and later joined without disturbing the adjustment setting.

The threads 50 on insert 42 and threads 52 on receptacle 36 may be either right or left handed and the same or different pitch from threads 16 on fitting 12 and threads 18 on insert 14 in FIG. 1. If the threads are opposite, i.e., 16 and 18 are right handed and 50 and 52 are left handed, rotation of the male inserts causes rapid adjustment in spacing between the support 38 and panel 10. This usually is preferable.

If the threads are all right or left handed but of a different pitch, a finer but slower adjustment may be achieved. However, this arrangement also results in an added advantage that a stop is provided at each extreme so that the inserts cannot come apart. For example, as insert 14 is rotated upwardly to move panel 10 downwardly, the top of insert 42 abuts against fitting 12 and prevents its further upward movement and subsequent release from receptacle 36. Also, rotation of insert 14 for deeper penetration through fitting 12 is prevented by abutment of fastener receptacle 48 against pin 40, or the bottom of the bore in receptacle 36 if there is one.

Figure 3:
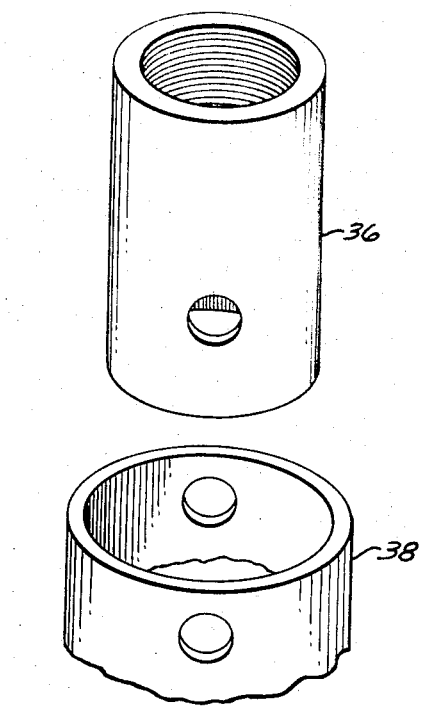
FIG. 3 is an exploded perspective view of the parts of the adjustment fastener.

In FIG. 3 there is shown an exploded perspective view of the parts of the adjustment fastener just described and further description is not deemed to be necessary.

Figure 4:
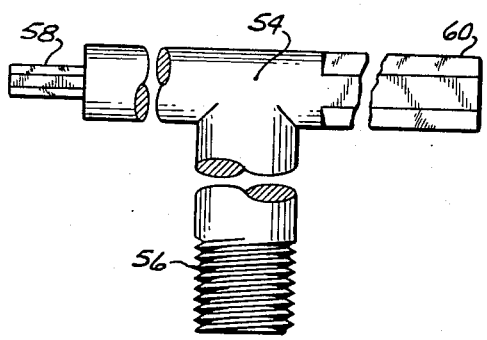
FIG. 4 is an elevational view of the single tool used with the fastener.

In FIG. 4 there is shown a single tool for the attachment, detachment, leveling or adjusting, and grasping for movement. This tool 54 has a leg 56 threaded to fit into the threaded bore 22 of insert 14 for use as a T-handle. End 58 is configured to fit into recess 34 of fastener 32 to effect its rotation in fastening inserts 14 and 42 together and in unfastening them. End 60 is configured to fit into bore 24 to effect its rotation for the spacing adjustment between the panel and support.

Having thus described an illustrative embodiment of the present invention, it is to be understood that modifications thereof will become apparent to those skilled in the art and it is to be understood that these deviations are to be construed as part of the present invention.

I claim:

1. An adjustment fastener for fastening an object to a panel comprising:
a first set of male-female threaded units for said panel including a fitting on said panel having a threaded bore and a first threaded male insert threaded therein, said insert having a tapered non-conical lower end,
a second set of male-female threaded units for said object including a threaded receptacle attached to said object, and a second threaded male insert threaded therein, said second insert having a bore in its upper end with tapered non-conical walls adapted to receive said first insert lower end, and means releasably fastening said male inserts together whereby rotation of said first insert causes rotation of said second insert.

2. An adjustment fastener as in claim 1 wherein the threads in said first unit is reversed from the threads in said second unit.

3. An adjustment fastener as in claim 1 wherein the threads in said first unit is of a different pitch from the threads in said second unit.

4. An adjustment fastener as in claim 1 wherein said first insert has a non-cylindrical bore therein to receive a tool for rotation thereof.

5. An adjustment fastener as in claim 1 wherein said first insert has a threaded bore therein to receive a handle for movement thereby.

6. An adjustment fastener as in claim 5 including a tool for rotating said first insert and for rotating said means, said tool also being insertable into said threaded bore to comprise said handle.

7. An adjustment fastener as in claim 1 wherein said means includes a bolt having a head retained by a shoulder in said first insert, said bolt passing through said second insert and held thereby by a fastener receptacle attached thereto.

* * * * *

PO-1050
(5/69)

UNITED STATES PATENT OFFICE
CERTIFICATE OF CORRECTION

Patent No. 3,778,957          Dated 18 December 1973

Inventor(s) Walter T. Appleberry

It is certified that error appears in the above-identified patent and that said Letters Patent are hereby corrected as shown below:

On the Title page, insert:--[73] Assignee: McDonnell Douglas Corporation, Santa Monica, California--.

Signed and sealed this 2nd day of July 1974.

(SEAL)
Attest:

EDWARD M. FLETCHER, JR.
Attesting Officer

C. MARSHALL DANN
Commissioner of Patents